United States Patent

Wada et al.

[11] Patent Number: 5,199,722
[45] Date of Patent: Apr. 6, 1993

[54] SEAL ASSEMBLY FOR STIRLING ENGINE

[75] Inventors: Yoshiaki Wada; Tunesaku Itaba; Koichiro Kasahara, all of Kashiwazaki; Yutaka Momose, Anjyo; Tetsumi Watanabe, Okazaki; Hiroyuki Katsuda, Okazaki, all of Japan

[73] Assignees: Kabushiki Kaisha Riken, Tokyo; Aisin Seiki Kabushiki Kaisha, Kariya, both of Japan

[21] Appl. No.: 725,680

[22] Filed: Jul. 3, 1991

[30] Foreign Application Priority Data

Aug. 10, 1990 [JP] Japan .................. 2-210176

[51] Int. Cl.⁵ .............................................. F16J 15/32
[52] U.S. Cl. .................................... 277/138; 277/227; 277/DIG. 6
[58] Field of Search ............... 277/138, DIG. 6, 216, 277/227

[56] References Cited

U.S. PATENT DOCUMENTS

| | | |
|---|---|---|
| 3,932,008 | 1/1976 | McCloskey et al. ......... 277/DIG. 6 |
| 3,999,894 | 12/1976 | Nakayama et al. ............... 277/177 |
| 4,098,515 | 7/1978 | Sakata ........................... 277/DIG. 6 |
| 4,206,930 | 6/1980 | Thrane et al. ..................... 277/216 |
| 4,431,698 | 2/1984 | Case et al. ........................... 277/227 |
| 4,580,790 | 4/1986 | Doose ......................... 277/DIG. 6 |
| 4,681,817 | 7/1987 | Shinada ...................... 277/DIG. 6 |
| 4,747,602 | 5/1988 | Kobayashi et al. ................ 277/216 |
| 4,941,669 | 7/1990 | Fujisawa ..................... 277/DIG. 6 |
| 4,972,764 | 11/1990 | Ohya et al. .................. 277/DIG. 6 |
| 4,986,511 | 1/1991 | Irby et al. .................... 277/DIG. 6 |

FOREIGN PATENT DOCUMENTS 58-19397 2/1983 Japan .
2-245085 9/1990 Japan .

Primary Examiner—William A. Cuchlinski, Jr.
Assistant Examiner—Daniel G. DePumpo
Attorney, Agent, or Firm—Finnegan, Henderson, Farabow, Garrett & Dunner

[57] ABSTRACT

A Stirling engine seal assembly includes a seal ring body and an expander. The seal ring body consists of a matrix made of polytetrafluoroethylene compounded and filled with carbon fibers and at least one powder selected from the group consisting of carbon powder, boron nitride powder and molybdenum disulfide powder. The plate expander is in abutting contact with the inner peripheral surface of the seal ring body for urging the seal ring body in the direction of its outer circumference.

4 Claims, 3 Drawing Sheets

SEAL ASSEMBLY FOR STIRLING ENGINE

BACKGROUND OF THE INVENTION

1. Field of the Invention

This invention relates to a self-lubricating seal assembly suitable for use in a Stirling engine.

2. Description of the Prior Art

As shown in FIG. 3, a Stirling engine has a cylinder 1 the interior of which is divided into an expansion chamber 3 and a compression chamber 4 by a working piston 2. The chambers 3 and 4 are interconnected via a heater, regenerator and cooler, none of which are shown, and the working space has an arrangement for sealing in a working gas such as helium. In order to minimize leakage of the working gas from one of the chambers 3, 4 to the other in a Stirling engine thus constructed, a gas seal assembly 6 is fitted into each of a plurality of ring grooves 5 provided in the outer peripheral surface of the working piston 2 and spaced apart longitudinally thereof.

In general, as illustrated in FIGS. 4 and 5, the gas seal assembly 6 fitted into the ring groove 5 of the working piston 2 comprises a stepped ring 7 and an expander ring 9. The stepped ring 7 comprises a composite material consisting mainly of a heat-curable resin such as polytetrafluoroethylene (PTFE resin) or polyimide resin filled with carbon fibers or carbon powder for the purpose of improving wear resistance and either thermal resistance or strength. The expander ring 9, which is made of steel, is placed in contact with the inner circumferential surface of the ring 7 to assure that the ring 7 will be held in pressured contact with the inner peripheral surface 8 of the cylinder. The stepped ring 7 has mutually opposing end faces 10, 11. The end face 10 is provided with a projection 10a extending circumferentially of the ring from its upper side, and the opposing end face 11 is provided with a projection 11a extending circumferentially of the ring from its lower side. The arrangement is such that the two projections 10a, 11a overlap each other. As a result, when the stepped ring 7 is installed in the groove 5, gaps A, B occur between the end face 10 and the projection 11a, and between the end face 11 and the projection 10a, respectively.

When a high-pressure gas from the expansion chamber 3 or compression chamber 4 acts upon the stepped ring 7, the latter is urged against a wall surface 12 of the ring groove 5, and working gas which has entered the bottom of the ring groove 5 cannot make its way to the gap B by virtue of the expander ring 9. An excellent sealing effect is thus obtained.

The opposing end faces of the ring 7 are not limited to the stepped configuration, for they can be straight-cut or angle-cut if desired.

In a Stirling engine, lubricating oil would mix in with the working gas and the oil would then attach itself to the cooler, regenerator and other components, thereby reducing the heat exchanging efficiency of the engine. In order to prevent this, the above-described seal ring assembly, which is self-lubricating (i.e., which does not employ a lubricant) is employed.

Recently, however, owing to the improved performance of Stirling engines and a worsening of the environment in which they are installed, there has been a significant increase in the ambient temperature within the engine and the conditions that result are quite severe insofar as a PTFE resin material is concerned. In addition, though there is a need for improved reliability in devices such as Stirling engines that use self-lubricating seal assemblies, a problem encountered is the large amount of wear that occurs when use is made of a dispersed material of carbon or glass fibers.

SUMMARY OF THE INVENTION

Accordingly, an object of the present invention is to provide a seal assembly for a Stirling engine which solves the aforementioned problems encountered in the prior art.

Another object of the present invention is to provide a long-life, highly wear-resistant, self-lubricating seal assembly for a Stirling engine.

According to the present invention, the foregoing objects are attained by providing a Stirling engine seal assembly comprising, in combination, a seal ring body consisting of a matrix made of polytetrafluoroethylene compounded and filled with carbon fibers and at least one powder selected from the group consisting of carbon powder, boron nitride powder and molybdenum disulfide powder, and a plate expander in abutting contact with an inner peripheral surface of the seal ring body for urging the seal ring body in the direction of an outer circumference thereof.

In a preferred embodiment, the seal ring body includes 10-20 percent by weight of carbon fiber, and 5-15 percent by weight of molybdenum disulfide powder, boron nitride power or carbon powder.

The seal ring body in accordance with the present invention is capable of reducing the amount of wear even under conditions of high temperature and load.

It should be noted that the present invention can be utilized in machinery such as compressors that operate under the same conditions as a Stirling engine.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 3:
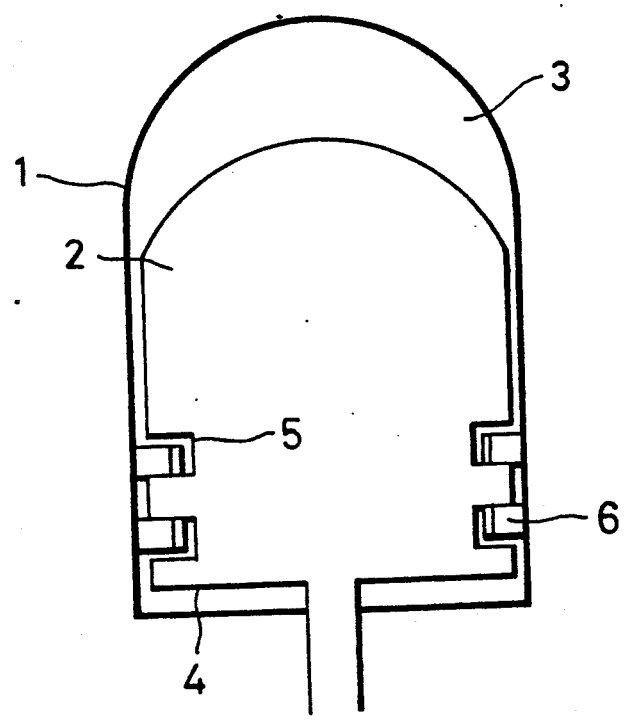
FIG. 3 is a sectional view of part of a Stirling engine.
Figure 4:
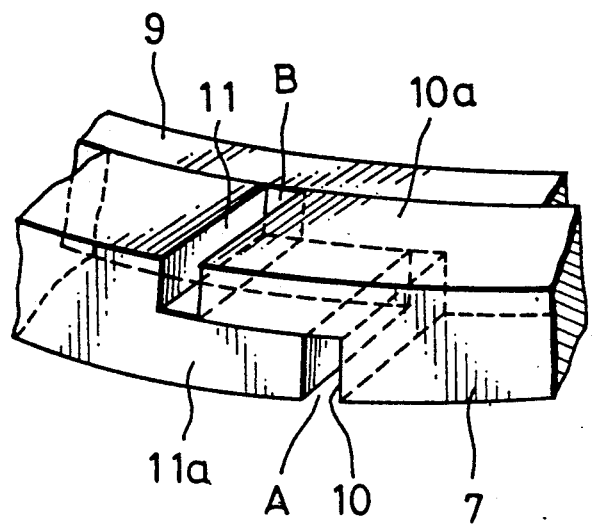
FIG. 4 is a partial perspective view of a seal ring assembly.
Figure 5:
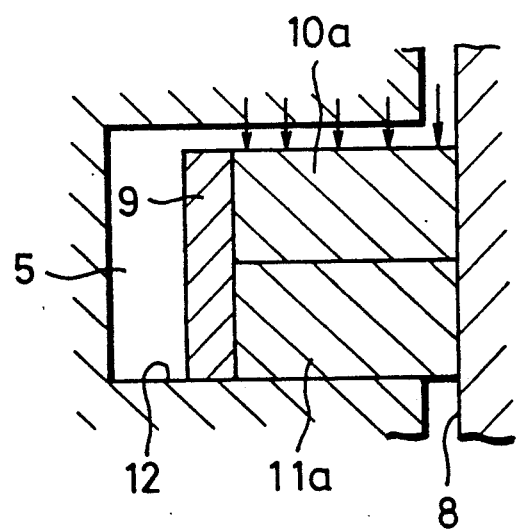
FIG. 5 is a sectional view illustrating the seal ring assembly in the mounted state.

The seal assembly according to an embodiment of the invention is applied, by way of example, to the Stirling engine 1 illustrated in FIGS. 3 through 5, and therefore a description of the example of application is deleted. The material constituting the seal ring body 7 will be described hereinafter.

Figure 1:
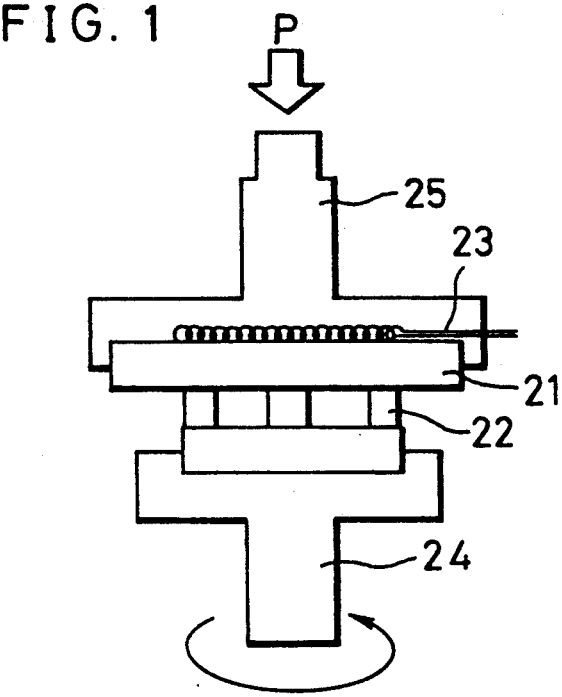
FIG. 1 is a side view illustrating a testing apparatus.

First, in a wear testing apparatus shown in FIG. 1, a sliding disk 21 was fabricated of a metallic material for a cylinder liner which slides while in contact with the outer circumferential surface of the seal ring body, and a pin 22 made of polytetrafluoroethylene (PTFE), which is the material of which the seal ring body is made, was adopted as the mate to the disk 21. A wear test was performed by rotating a shaft 24 on the pin side and applying a load to the pin 22 from a shaft 25 on the disk side to produce relative sliding contact between the disk 21 and the pin 22. A heater 23 disposed on the upper portion of the disk 21 was used to apply heat to the surface of the disk 21 during operation. Though various materials can be selected for the disk 21, SUS 304 (stainless steel) was employed in the test.

The pin 22 consisted of the aforementioned PTFE resin used as a matrix filled with 10-20 percent by weight of carbon fibers having a fiber length of 100-700 $\mu$m and a fiber diameter of 10-20 $\mu$m, and 5-15 percent by weight of carbon powder having a particle diameter of 1-30 $\mu$m. The two sliding surfaces were brought into abutting contact at a surface pressure of 20 kg/cm$^2$, and the frictional sliding between the surfaces was performed in the atmosphere at a speed of 0.6 m/sec for 4-5 hr.

In an test for purposes of comparison, a pin was fabricated consisting of PTFE resin as the matrix made to contain 10-20 percent by weight of carbon fibers alone having a fiber length of 100-700 $\mu$m and a fiber diameter of 10-20 $\mu$m. The frictional sliding conditions were the same as those described above.

Figure 2:
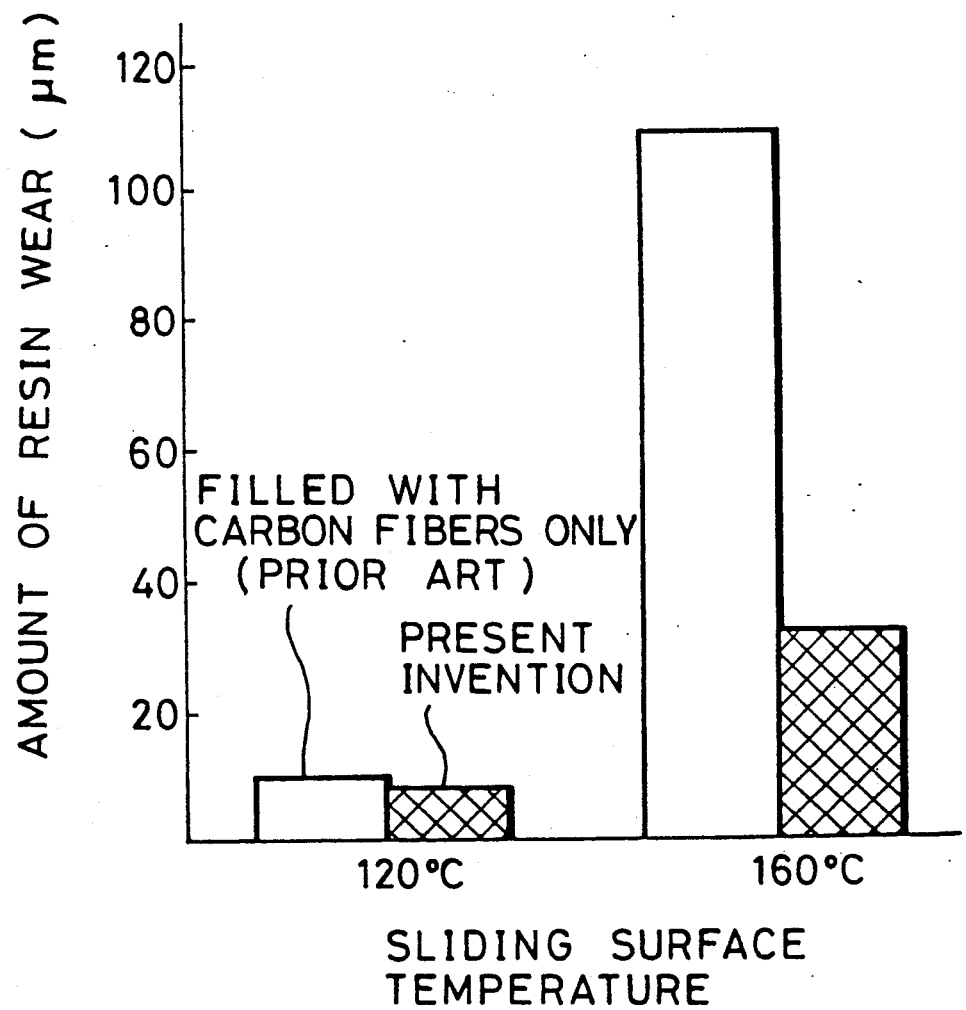
FIG. 2 is a graph illustrating wear resistance.

The results of the friction tests are shown in FIG. 2. It was confirmed that the present invention makes it possible to greatly reduce the amount of wear sustained under conditions of high temperature and load.

The present invention is advantageous in that the wear resistance of a seal ring under conditions of high temperature can be improved greatly merely by compounding and filling a base of carbon fibers with a powder having a self-lubricating property.

As many apparently widely different embodiments of the present invention can be made without departing from the spirit and scope thereof, it is to be understood that the invention is not limited to the specific embodiments thereof except as defined in the appended claims.

What is claimed is:

1. A sliding seal assembly for use with an annular sliding surface that frictionally contacts said surface and slides relative to it, said assembly comprising, in combination:

a seal ring body having an inner circumferential surface and an outer circumferential surface in sliding contact with said sliding surface, said body consisting of a matrix of polytetrafluoroethylene resin filled with from 10 to 20% by weight of carbon fibers having a length of from 100-700 $\mu$m and a diameter of from 10-20 $\mu$m and from 5 to 15% by weight of at least one powder having a particle diameter of from 1-30 $\mu$m selected from the group consisting of carbon powder, boron nitride powder and molybdenum disulfide powder; and an expander ring in abutting contact with the inner circumferential surface of said seal ring body for urging said seal ring body against said sliding surface.

2. The sliding seal assembly of claim 1, wherein the powder is carbon powder.

3. The sliding seal assembly of claim 1, wherein the powder is boron nitride powder.

4. The sliding seal assembly of claim 1, wherein the powder is molybdenum disulfide powder.

* * * * *